US009523982B2

(12) United States Patent
Hastings et al.

(10) Patent No.: US 9,523,982 B2
(45) Date of Patent: Dec. 20, 2016

(54) TETHERED GYROGLIDER CONTROL SYSTEMS

(71) Applicants: Gregory Howard Hastings, Greenbank, WA (US); David Lang, Vashon, WA (US); Grant Howard Calverley, Friday Harbor, WA (US)

(72) Inventors: Gregory Howard Hastings, Greenbank, WA (US); David Lang, Vashon, WA (US); Grant Howard Calverley, Friday Harbor, WA (US)

( * ) Notice: Subject to any disclaimer, the term of this patent is extended or adjusted under 35 U.S.C. 154(b) by 61 days.

(21) Appl. No.: 14/471,522

(22) Filed: Aug. 28, 2014

(65) Prior Publication Data
US 2015/0039161 A1 Feb. 5, 2015

Related U.S. Application Data

(63) Continuation of application No. PCT/US2013/027911, filed on Feb. 27, 2013.
(Continued)

(51) Int. Cl.
*G05D 1/00* (2006.01)
*G05D 1/10* (2006.01)
(Continued)

(52) U.S. Cl.
CPC ............... *G05D 1/00* (2013.01); *A63H 27/04* (2013.01); *A63H 30/02* (2013.01); *B64C 39/022* (2013.01);
(Continued)

(58) Field of Classification Search
CPC ................ F05B 2240/917; F05B 2240/921; Y02E 10/728; G05D 1/0866; B64C 39/022
See application file for complete search history.

(56) References Cited

U.S. PATENT DOCUMENTS 3,223,359 A   12/1965   Quick
3,987,987 A   10/1976   Payne
(Continued)

FOREIGN PATENT DOCUMENTS

JP    2007532408        11/2007
RU       668145 U1      11/2007
(Continued)

OTHER PUBLICATIONS

Amelin K.S. et al. Adaptativnoe upravlenie avtonomnoy gruppoy bespilotnykh 1-14letatelnykh apparatov. Naychny zhumal "Stokhasticheskaya optimizatsiya vinformatike" ISSN 2226-3772 (online), ISSN 1992-2922 (Print), Tom 5, 2009,[retrieved on Oct. 7, 2013] Retrieved from the Internet:<URL:http://www.math.spbu.ru/user/gran/optstoch.htm>.
(Continued)

*Primary Examiner* — Todd Melton

(57) ABSTRACT

A flight control system for at least one tethered gyroglider along a flight path consistent with at least one flight mission is configured to fly the gyroglider within a portfolio of winds, managing an interaction between portfolios of at least four envelopes including wind, gyroglider performance, flight and base station. Every flight mission corresponds to at least one flight path associated with a set containing at least one first value and at least one second value. The control system is provided with a learning and library manager comprising a repository having stored sets of first values and associated second values for each flight path. The current first values associated with a current mission are corrected based on predicted or experienced flight paths and measurable outputs to attain the desired flight path. The corrected, experienced values, flight path and measurable output are further stored in the repository for further learning.

16 Claims, 6 Drawing Sheets

Related U.S. Application Data

(60) Provisional application No. 61/634,423, filed on Feb. 29, 2012.

(51) Int. Cl.

| | | |
|---|---|---|
| *B64C 39/02* | (2006.01) | |
| *A63H 30/02* | (2006.01) | |
| *A63H 27/04* | (2006.01) | |
| *G09B 9/08* | (2006.01) | |
| *F03D 5/00* | (2006.01) | |
| *F03D 7/00* | (2006.01) | |
| *G05D 1/08* | (2006.01) | |

(52) U.S. Cl.
CPC . *F03D 5/00* (2013.01); *F03D 7/00* (2013.01); *G05D 1/0866* (2013.01); *G09B 9/08* (2013.01); *F05B 2240/917* (2013.01); *F05B 2240/921* (2013.01); *Y02E 10/70* (2013.01); *Y02E 10/723* (2013.01); *Y02E 10/728* (2013.01)

(56) References Cited

U.S. PATENT DOCUMENTS

| | | | |
|---|---|---|---|
| 4,124,182 A | 11/1978 | Loeb | |
| 5,149,020 A | 9/1992 | Rundle | |
| 5,301,900 A | 4/1994 | Groen | |
| 5,381,988 A | 1/1995 | Kattas | |
| 5,971,320 A | 10/1999 | Jermyn | |
| 5,996,934 A | 12/1999 | Murph | |
| 6,072,245 A | 6/2000 | Ockels | |
| 6,254,034 B1 | 7/2001 | Carpenter | |
| 6,523,781 B2 | 2/2003 | Ragner | |
| 6,781,254 B2 | 8/2004 | Roberts | |
| 7,109,598 B2 * | 9/2006 | Roberts | F03D 1/001 290/44 |
| 7,183,663 B2 | 2/2007 | Roberts | |
| 7,188,808 B1 | 3/2007 | Olson | |
| 7,275,719 B2 | 10/2007 | Olson | |
| 7,504,741 B2 * | 3/2009 | Wrage | F03D 5/00 290/44 |
| 7,656,053 B2 * | 2/2010 | Griffith | B63H 9/0685 244/153 R |
| 8,894,001 B2 * | 11/2014 | Calverley | F03D 5/00 244/17.23 |
| 8,922,046 B2 * | 12/2014 | Vander Lind | B64C 31/06 290/55 |
| 2003/0066934 A1 | 4/2003 | Bolonkin | |
| 2005/0046197 A1 | 3/2005 | Kingsley | |
| 2007/0176432 A1 | 8/2007 | Rolt | |
| 2008/0210826 A1 | 9/2008 | Ockels | |
| 2009/0097974 A1 | 4/2009 | Ippolito | |
| 2009/0278353 A1 | 11/2009 | Pardal | |
| 2010/0019091 A1 | 1/2010 | Milanese | |
| 2010/0230546 A1 | 9/2010 | Bevirt | |
| 2011/0025061 A1 * | 2/2011 | Roberts | F03D 5/06 290/44 |
| 2011/0266809 A1 | 11/2011 | Calverley | |
| 2013/0140827 A1 | 6/2013 | Carroll | |
| 2013/0154275 A1 | 6/2013 | Calverley | |
| 2016/0032895 A1 | 2/2016 | Weddendorf | |

FOREIGN PATENT DOCUMENTS

| | | |
|---|---|---|
| WO | 2007141795 A1 | 12/2007 |
| WO | 2009126988 A1 | 10/2009 |
| WO | 2011087541 A2 | 7/2011 |

OTHER PUBLICATIONS

Zhdanov A.A. Adaptivnye mashiny—neizbezhnoe napravlenie razvitiya tekhniki. 1-14Zadachi i problemy. XII Vserossiyskaya nauchno-tekhnicheskaya konferentsiya "Neiroinformatika—2010": Lektsiya po neiroinformatike.—M.: Niyau Mifi, 2010,pp. 162-211.

* cited by examiner

US 9,523,982 B2

TETHERED GYROGLIDER CONTROL SYSTEMS

FIELD OF THE DISCLOSURE

The present disclosure relates to control systems, particularly in relation to tethered gyrogliders.

DEFINITIONS

The expression 'flight path' used in the specification refers to but is not limited to calculated, experienced or simulated desired flight path having characteristics including tether angles, tether angular acceleration comprising tension, rotational and positional state vectors and the like that identify a flight path.

The expression 'stored flight path' used in the specification refers to but is not limited to the determined flight path along with the experienced flight path that is essentially the determined flight path that is performed or executed.

The expression 'flight mission' used in the specification refers to but is not limited to the production of a measurable output.

The expression 'state of the tethered gyroglider' used in the specification refers to but is not limited to the current operational condition of the gyroglider and its tether along with the operational conditions of the associated means of the flight control system.

The expression 'certainty of performance' used in the specification refers to but is not limited to the serial dependence of many devices, means and methods of operation, including their materials, specifications, weight, fitness for purpose, and provenance, title, perfected interest determination, as any single device, component, assembly, system, maintenance and operational defect or failure endangers the entire system, all appurtenant systems, proximate real property and persons, dependent economic, contractual and practical obligations at risk of economic and practical loss or of physical harm including the loss of human life.

The expression 'obstructions' used in the specification refers to but is not limited to fixed or airborne objects and restricted airspace.

The expression 'current' used in the specification with reference to first values, flight mission and the like refers to the associated values/state for a selected mission of the at least one gyroglider.

The expression 'at least one determined flight path that substantially associates with the at least one current flight mission' used in the specification refers to but is not limited to the determined flight path being associated with the selected flight mission within acceptable limits of tolerance. For instance, if the selected flight mission is generating a power of say 1000 W. The determined flight path may generate the desired power of 1000 W or at least generate power within predetermined acceptable tolerance of the desired power, say 900 W, if the predetermined tolerance is 10%.

The expression 'dynamic element' used in the specification refers to but is not limited to at least one of proximate wind vectors, wind forecasts, base station location, obstructions, geospatial locations of the at least one tethered gyroglider, geospatial location of proximate gyrogliders and their tethers, geospatial velocity, tether tension, tether length extended, tether behavior, tether health, payload, state of the at least one tethered gyroglider, onboard power system means, communication means, base station mains power and auxiliary power means, mission status, appurtenant market and customer circumstances, measurable output associated with the at least one flight mission.

These definitions are in addition to those expressed in the art.

BACKGROUND

Wind is a means of production that can be described in terms of a portfolio of opportunities for creating value. Similarly, a range of apparatus, controls, methods, locations, appurtenant markets and mission information describe another portfolio of opportunities to realize value from wind. Tethered gyroglider control systems are required to take into consideration a union of these two dynamic portfolios to improve the certainty of performance and value creation along with a unique third circumstance of the physical presence, constraints, integrity, sufficiency, lifecycle and lifetime costs, performance and safety of the tether itself, and of the systems' dependence on, or independence from the tether.

Terrestrial wind powered generation systems have historic precedence, characterized by five general observations:

Firstly, the apparatus used to convert energy contained in wind into another form of useful power is typically present at a fixed location, and may be equipped to pivot or is provided with other mechanisms to alter the orientation of the apparatus and associated features to most favorably address prevailing intermittent terrestrial wind, but within the context of a fixed location and height generally above the nap of the earth.

Secondly, the understanding of wind is typically described in some generality as to intermittent winds, whose velocity, time of day, seasonality, averages and the like, with control systems generally responding to the present wind, seeking to orient the apparatus and its controls relative to the present wind, together with other adjustments that seek to optimize power conversion, minimize cost and risk, including those conditions that might endanger the apparatus itself, or to property or persons in the vicinity of such apparatus.

Thirdly, the performance characteristics of terrestrial wind power generating apparatus known in the art have proven that power tends to increase as the speed of relative wind increases, however only up to a point where excess wind energy is passed or avoided that might endanger the apparatus or appurtenant systems. This results in power generation that reaches a plateau of diminishing realized power at comparatively slow wind velocities, and independent of what could be ever increasing wind velocities. It is also observed that power generation itself is intermittent to a substantial degree, dependent solely on the proximate available wind that sustain operation.

Fourthly, the terrestrial wind turbines are large, robust fixed structures that are typically around 200 to 500 feet tall, in part to reach those heights, and to deploy larger rotor blades to capture available wind energy. Their design requires hundreds of tons of steel and other material, plus substantial permanent foundations and supporting infrastructures that many people regard as a blemish to an otherwise unobstructed natural landscape, seascape and horizon, yet the public has come to expect them as necessary artifacts for satisfying clean and renewable energy policies and mandates. Their design and operation also suffer under the tax of the square-cube rule that describes aspects of diminishing net performance results from increases in the scale, mass or size of rigid structures.

Fifthly, terrestrial wind turbines operate generally as single-unit autonomous systems, independent of each other—working well or less well individually as an intermittent power generation source—the sum of collective performance managed as inputs to a comprise a collective output. Generally, a single terrestrial wind turbine's electrical, mechanical, and structural or other physical failure is independent of other terrestrial wind turbines deployed within the fixed proximity in groups, clusters or "wind farms."

Stationary terrestrial wind power generation systems wait for wind to arrive at a fixed location, and then adjust to that wind within the notable constraints discussed above. This is opposed to the new dynamics of agile tethered gyrogliders that can effectively hunt for favorable wind from among a portfolio of winds that can occur at almost any altitude, location and geospatial dimension, and then employ an array of apparatus, navigation, control and operating strategies to maximize power generation from among that portfolio of available and anticipated winds with notably different characteristics including widely varying air density and about fifty times the energy content of terrestrial wind. Stationary terrestrial wind power generation systems are designed for intermittent power generation of essentially fixed production levels (steep initial power curve and long plateau) also limited by available wind, or absence of wind, at a fixed location. Their performance generally comprises two states: A.) operating and generating power and B.) not operating and not generating power, both for periods of several or many hours at a time in each state.

Power generated by tethered gyrogliders envisioned by the control system introduces other states that differ from stationary terrestrial wind turbines and include 1.) Power generation cycles that are limited by controlled navigation amid generally sufficient winds, consisting of separate and rhythmic power strokes that harness kinetic energy from available wind, and recovery strokes that reposition the gyroglider for a subsequent power stroke. This mimics the rhythmic pumping-like action of a piston inside a reciprocating engine. 2.) The capacity for asymmetrical performance with the force generated by the power stroke generally being greater in the outbound direction, and the recovery stroke being driven by the retrieval under power of the requiring a lesser amount of force (power, energy) required by the system for that purpose. 3.) The capability for a static state consistent with loitering in fixed geospatial location that is not unlike the use of a clutch that operates in between a motor and transmission in an automobile. 4.) The capacity to navigate from one geospatial location to another geospatial location. 5.) The capacity to coordinate rhythmic power and recovery strokes among more than one gyroglider to harmonize their collective production, in similar fashion to a multi-cylinder engine that delivers consistent performance by their combination. 6.) The capacity to coordinate a field, swarm or collection of such gyrogliders and their tethers safely, individually and in unison, so as to preserve the exclusive geospatial requirements of each individual gyroglider, its appurtenant systems and its tether, separate from all others in proximity to avoid collisions, entanglement or other potentially or actual harmful circumstance. and, 7.) The capacity to coordinate the deployment, geospatial location, navigation, appurtenant systems, including the ground station and its appurtenant systems, and the critical integrity, sufficiency and performance of the tether, amid error conditions or other events, that have or may compromise, one or more of the gyroglider, tethers, ground stations or other assets, property or people in proximity.

Therefore, tethered gyrogliders call for a fundamentally different control system that employs advantages of these new dynamics. These dynamics can be observed, determined, calculated and used in simulations, analyzed in real time or before or after, or by analysis of historic performance or experience, and can be synthesized into control system apparatus, methods, control strategies, including logs, algorithms, bespoke calculating machines, prescribed flight control libraries, unique identities and abstracted or synthesized characteristics of structural, functional, control or operating components, smart sensors and smart sensor networks including those deployed in or along the length of the tether, and appurtenant communications, signaling or transmission apparatus, and used to observe, seek to control and navigate gyrogliders at heights at or above the nap of the earth. Such observation, determination, calculation, simulation, analysis and synthesis includes a portfolio of proximate winds, and those that might become proximate, at almost any altitude, geospatial location, geospatial dimension or duration, and the agile navigation of gyrogliders, in any orientation, or navigated paths relative to such terrestrial wind or those aloft, and to the gyroglider's base station, farm, and coordinated with other gyrogliders in proximity.

Unlike terrestrial wind turbines that have no control to seek or reach other winds other than those that happen to occur at their fixed location, the combined characteristics of tethered gyrogliders, ground stations, wind and climatic forecasts and the control systems make possible the prospect to search for, and if possible, identify and utilize a portfolio of winds that are either present, or anticipated, that are favorable to such power generation system's operation, or for other applications for tethered gyrogliders. This also includes the prospect to sustain performance by utilizing a portfolio of winds versus terrestrial wind present, typically, not at a fixed location; however there can be no assurance that sufficient winds are reasonably located within the present, possible or anticipated geospatial location of a tethered gyroglider's base station and its base station envelope comprising the geospatial locations all prior art gyroglider flight controls, together with the control systems described herein, point to.

Generally speaking, tethered gyrogliders are agile and powerful aircrafts, capable of navigation and generating forces in multiple dimensions, geospatial orientations and navigational maneuvers, individually or concurrently, as a group, cluster or in a swarm, and in any combination thereof, even those that may appear to consist of static geospatial positions of the gyroglider. Tethered gyroglider control systems also differ from untethered aircraft control systems as a result of the dynamics that result from such tethering including constrained aeronautical, aero-elastic behavior. Tethered gyrogliders are also typically complex tensile structures. Generally speaking, a tethered aircraft especially gyrogliders, can be described as having a force of tension acting between two points of the base station anchor and the very tips of the rotor blades, such force of tension being conducted through the tether, through the rotor hub and to the rotor blades themselves as the other end point anchor. The gyroglider's fuselage, control devices and elements of the ground station are among the notable exceptions to an otherwise typical predominantly tensile structural design, and are themselves subject to, are involved in, and seek to withstand and effect control over significant forces experienced by the system. If the gyroglider's design is more akin to a kite, it also experiences tensile forces acting between ground station anchor point, through the tether, to the kite's structure, and over its surface which may require a complex description as an end point anchor per se. Therefore, concepts of relative up or down, left or right, or compassbearing or point-to-point ground-position referenced navigational controls and vectors are incomplete to describe the simultaneous linear and non-linear phenomena and forces present, experienced, determined and calculated by the control system, and transmitted to a network of navigational and system controls, the tether, base station controls, farm controls, physical, electronic and cyber security and safety systems, and those other controls of appurtenant apparatus or systems. This is equally true of the term "optimal" which is an approximation that over time, and with the control system's capacity to simulate, synthesize, anticipate, realize and acquire experience, can be refined by the control system's capabilities to learn and/or adapt itself in a continuous attempt to better approximate "optimal" performance, which may be highest performance, minimum performance or any among a range of performance objectives, amid uncertainty, linear and non-linear complexities. The gestalt of these various dynamics of tethered gyrogliders and control systems, taken together, comprises a performance envelope for the tethered gyroglider.

SUMMARY

In accordance with the present disclosure, there is provided a control system for at least one tethered gyroglider along a flight path consistent with at least one flight mission, the control system comprising:
  a learning and library manager having a repository, the library manager adapted to receive and store in the repository,
    at least one of measured, simulated and calculated first values corresponding to at least one dynamic element associated with the at least one flight mission;
    at least one second value corresponding to pre-determined settings associated with the at least one flight mission; and
    stored flight paths associated with stored sets containing at least one of the stored first values and at least one of the stored second values, the stored flight paths corresponding to the at least one flight mission;
  an input manager adapted to receive current first values corresponding to the current state of the at least one dynamic element;
  a settings manager adapted to receive second values associated with at least one current flight mission of the at least one tethered gyroglider;
  a flight path controller comprising:
    a flight path generator adapted to receive a current set containing at least one of the current first values and at least one of the second values and the stored flight path along with the associated at least one stored set for the at least one current flight mission; the flight path generator further adapted to perform at least one of an iterative comparison, analysis, simulation, optimization, testing, ranking, rating and filtering of the received at least one current first value, with reference to the received at least one stored first value, to compute at least one corrected first value to co-operate with the received at least one second value and generate at least one determined flight path that substantially associates with the at least one current flight mission; and
    an editor adapted to append the stored sets with the current set containing the corrected first values, the second values and the determined flight path for the at least one current flight mission; and an activity processor adapted to receive and monitor the corrected first values and further adapted to perform at least one of allocating, segmenting, translating and transposing the corrected first values to at least one of flight control devices, generator controller, tension management means and base station control devices to achieve and generally maintain the position of the at least one tethered gyroglider along the determined flight path.
  Additionally, the flight path controller as described herein above further comprises at least one of:
    forecasting means adapted to either forecast or determine wind envelopes of variable geospatial dimension and duration relative to a plurality of base station envelopes consistent with at least a part of a farm, and flight envelopes corresponding to positions, states and performance envelopes of each of the at least one tethered gyroglider;
    an event manager adapted to determine safety and certainty of performance of each of the at least one tethered gyroglider based on the at least one current flight mission and further adapted to prescribe either an immediate prescriptive action or another flight mission; and
    reporting means adapted to report data associated with at least one of the first values.

Typically, the current flight mission is associated with a measurable output including at least one of time aloft, areas viewed, items of interest identified, monitored and subsequent actions enabled, communication enabled, geoengineering accomplished, civil engineering data gathered, mechanical engineering data gathered, aeronautical data gathered, climatic data gathered, power generated, timing, quantity and quality of power produced in relation to market demand, pricing and negotiations.

Typically, the current flight mission is selected from the group consisting of surveillance, communication, geoengineering, positioning of airborne assets, power generation and propulsion.

Typically, the dynamic element includes at least one of proximate wind vectors, wind forecasts, base station location, obstructions, geospatial locations of the at least one tethered gyroglider, geospatial location of proximate gyrogliders and their tethers, geospatial velocity, tether tension, tether length extended, tether behavior, tether health, payload, state of the at least one tethered gyroglider, onboard power system means, communication means, base station mains power and auxiliary power means, mission status, appurtenant market and customer circumstances, measurable output associated with the at least one flight mission.

Typically, the second values great least one of a fixed value, a range, an array, a mathematical function that returns a fixed value, a range, array of values when employed that represent a device, system control or logical parameters, including threshold values, ranges, limits, operational goals, specification of the at least one flight mission, specifications of the at least one tethered gyroglider and associated components, serial or registration numbers, specifications, material and weight of the components and the tether.

In accordance with the present disclosure, the flight control devices are adapted to receive the corrected first values and further adapted to control an array of means and methods to control the behavior of the at least one tethered gyroglider including controlling thrust, pitch, roll, yaw, power generation, tether functions, payload functions, reporting functions and timing and synchronization functions.

Again, in accordance with the present disclosure, the tension management means is adapted to receive the corrected first values and further adapted to monitor and control tether tension, tether payout, rewind speed and tether length extended and transmit associated data to the input manager.

Further, in accordance with the present disclosure, the generator controller is adapted receive and monitor the corrected first values and further adapted to control a motor generator that acts as a power-generating brake during tether payout and as a winch during tether rewind cycles.

Furthermore, in accordance with the present disclosure, the base station control devices are adapted to co-operate with a business and mission controller to compare measurable output associated with the at least one current flight mission, based on at least one of simulations, forecasts, expectations, market-based settings including quality, quantity, pricing, optionality, bidding and costs in participation with proximate facilities of associated commercial entities, control systems and networks and further adapted to communicate the comparison to the settings manager.

In accordance with the present disclosure, there is provided a method for controlling a tethered gyroglider along a flight path consistent with at least one flight mission, the method comprising the steps of:

receiving and storing in a repository, at least one of measured, simulated and calculated first values corresponding to at least one dynamic element associated with at least one flight mission;

receiving and storing in the repository, at least one second value corresponding to pre-determined settings associated with the at least one flight mission;

receiving and storing flight paths corresponding to the at least one flight mission in the repository, the stored flight paths being associated with stored sets containing at least one of the stored first values and at least one of the stored second values;

receiving current first values corresponding to the current state of the at least one dynamic element;

receiving second values associated with at least one current flight mission;

receiving at least one stored flight path along with the associated at least one stored set corresponding to the at least one current flight mission;

performing at least one of iteratively comparing, analyzing, simulating, optimizing, testing, ranking, rating and filtering of the received at least one current first value with reference to the received at least one stored first value;

computing at least one corrected first value to co-operate with the received at least one second value;

generating at least one determined flight path that substantially associates with the at least one current flight mission;

appending the stored sets with the current set containing the corrected first values, associated second values and the determined flight path for the at least one current flight mission;

receiving and monitoring the corrected first values;

performing at least one of allocating, segmenting, translating and transposing the corrected first values to achieve and generally maintain the position of the at least one tethered gyroglider along the determined flight path.

Typically, the step of receiving current first values includes the steps of determining at least one of proximate wind vectors, wind forecasts, base station location, obstructions, geospatial locations of the at least one tethered gyroglider, geospatial location of proximate gyrogliders and their tethers, geospatial velocity, tether tension, tether length extended, tether behavior, tether health, payload, onboard power system means, communication means, base station mains power and auxiliary power means, mission status, appurtenant market and customer circumstances and measurable output associated with the at least one flight mission.

Additionally, the step of generating at least one determined flight path further includes at least one of the steps of:

forecasting or determining wind envelopes of variable geospatial dimension and duration relative to a plurality of base station envelopes consistent with at least a part of a farm, and flight envelopes corresponding to positions and performance envelopes of each of the gyrogliders;

determining safety and certainty of performance of each of the gyrogliders based on the at least one current flight mission and prescribing either an immediate prescriptive action or another flight mission; and reporting data associated with at least one of the first values.

Typically, the step of performing at least one of allocating, segmenting, translating and transposing the corrected first values further includes at least one of the steps of:

receiving the corrected first values and controlling an array of means and methods to control the behavior of the at least one tethered gyroglider including controlling thrust, pitch, roll, yaw, power generation, tether functions, payload functions, reporting functions and timing and synchronization functions;

receiving the corrected first values; monitoring and controlling tether tension, tether payout and rewind speed and tether length extended; and transmitting associated data to an input manager;

receiving and monitoring the corrected first values; and controlling a motor generator that acts as a power-generating brake during tether payout and as a winch during tether rewind cycles; and comparing a measurable output associated with the at least one current flight mission, based on at least one of simulations, forecasts, expectations, market-based settings including quality, quantity, pricing, optionality, bidding and costs in participation with proximate facilities of associated commercial entities, control systems and networks and further communicating the comparison to a settings manager.

BRIEF DESCRIPTION OF THE ACCOMPANYING DRAWINGS

The features of the present disclosure will become fully apparent from the following description, taken in conjunction with the accompanying drawings. Understanding that these drawings depict only typical embodiments of the disclosure and are, therefore, not to be considered limiting of its scope, the disclosure will be described with additional specificity and detail through use of the accompanying drawings in which.

DETAILED DESCRIPTION

Figure 1:
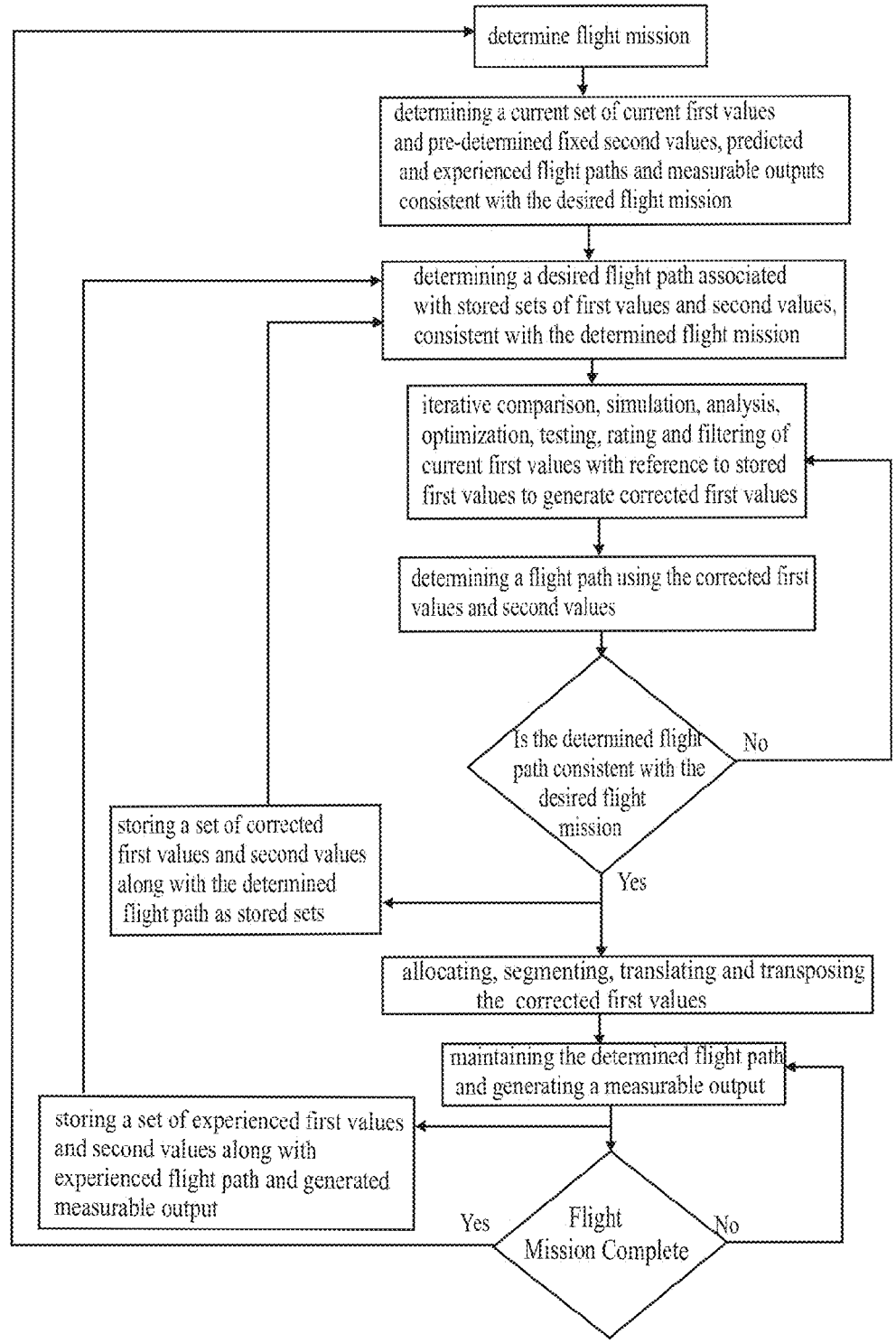
FIG. 1 illustrates a flow chart of a control system in accordance with the present disclosure for at least one tethered gyroglider.

It will be readily understood that the components of the present disclosure, as generally described and illustrated in the drawings herein, could be arranged and designed in a wide variety of different configurations. Thus, the following more detailed description of the embodiments of the system of the present disclosure, as represented in the drawings, is not intended to limit the scope of the disclosure, as claimed, but is merely representative of various embodiments of the disclosure. The illustrated embodiments of the disclosure will be best understood by reference to the drawings, wherein like parts are designated by like numerals throughout.

Powered by the wind itself, the advent of tethered gyrogliders make practical, persistent high-altitude controlled flight of weeks or months-long duration, from ground level altitudes up to and amid polar and subtropical jetstream winds. A range of primary commercial or practical value that can result from this capability suggests the potential of tens of thousands of such gyrogliders, either flying alone or in coordinated swarms amid high-altitude and jetstream winds, make an unprecedented secondary value of direct wind, atmospheric, aeronautical and other measurements by on-board sensors and instrumentation, en mass over wide geographic regions concurrently (zero time skew) possible. The tethered gyrogliders and resulting atmospheric, wind and aeronautic information can be said to be interdependent.

A control system as envisaged by the present disclosure is configured to fly at least one tethered gyroglider operating within a portfolio of sustained or anticipated winds, managing an interaction between portfolios of at least four envelopes including wind, gyroglider performance, flight and base station envelopes with the intent of creating a measurable output consistent with at least one flight mission, and addressing functional or operational factors that could enhance or detract from that measurable output.

A flight mission for a tethered gyroglider with a control system as disclosed typically includes, surveillance, communication, geoengineering (including disbursement of airborne materials, civil engineering and climatic data gathering), positioning of airborne assets, power generation, propulsion and loitering between missions. Accordingly, the measurable output includes at least one of time aloft, civil engineering and climatic data collected, areas viewed, items of interest identified, monitored and subsequent actions enabled, communication enabled, geoengineering accomplished, power generated, timing, quantity and quality of power produced in relation to market demand, pricing and negotiations corresponding to the selected flight mission. The gyroglider is tethered to a base station. The base station, optionally, incorporates sub systems geared to produce energy. The flight path of the tethered gyroglider is contained within a flight envelope that is computed based on the mission's objective, consistent with wind conditions, including air density, velocity and other characteristics as wind envelopes present or anticipated, and parameters that contribute to the control of the tethered gyrogliders by the base station. Such parameters include performance characteristics of the tethered gyroglider, characteristics of concurrent or anticipated winds and wind envelopes, geospatial location of the base station, payload characteristics, if any, performance characteristics of operating components, the business purpose, economic and operational factors.

Alternatively a flight path is selected from among a library of predetermined flight paths based upon winds or wind envelopes present or anticipated, tethered gyroglider performance characteristics and those of its operating components, unique serial numbers and other identifying codes of fixtures and functional components, their specifications, materials and weight, and the mission's objectives, business purpose, economic and operational factors.

A single gyroglider or a plurality of tethered gyrogliders, operating collectively as a group, cluster or swarm, or independently, together with their payloads, if any, unique serial numbers and other identifying codes of fixtures and functional components are used by the control system to aid calculations, assure functional interoperability and the certainty of performance when controlling the flights of the single or plurality of gyrogliders in a coordinated manner. The unique IDs and codes also serve the purpose of achieving compliance with quality controls, licenses and certifications, their provenance, title and perfected interest determinations, and to meet financing and governance requirements.

In general, the principles of operation of tethered gyrogliders and their control are discussed in U.S. Patent Application US20110266809 in the name of Grant Calverley. Further, U.S. application Ser. No. 13/709,201 in the name of Grant Calverley and Scott Webster discloses means for effectively harnessing tension in the tether. Several other patent applications have disclosed endeavors towards power generation by controlling kites. U.S. Pat. No. 7,656,053 is based on utilizing the ratio of the force on the kite during traction phase to the force on the kite during the recovery phase for power generation. US Patent application 20080210826 discloses a kite control that depends on increasing/decreasing length of a connection cable for controlled kite movements. Again US Patent application 20110025061 discloses a tethered platform provided with plurality of mill rotors that keep the kite aloft. The tethered gyrogliders known in the art rely solely on computerized simulation and do not provide a comprehensive and optimized solution that can guarantee control of a single gyroglider or a swarm of tethered gyrogliders. The need of the hour is a learning and library manager that stores data that can be utilized by the gyrogliders during the mission for every computation and flight paths can be replicated in real time without a need for peripherals or computation thereby increasing operational resilience and reducing costs considerably.

A control system of the present disclosure for one or a swarm of tethered gyrogliders is intended to achieve and generally maintain at least one tethered gyroglider along a desired flight path consistent with a selected flight mission. Each flight mission is further associated with a measurable output.

Referring to FIG. 1, at least one flight mission is first determined. Each flight mission involves dynamic elements including at least one of proximate wind vectors, wind forecasts, base station location, obstructions, geospatial locations of the tethered gyroglider(s) involved in the selected mission, geospatial location of proximate gyrogliders and their tethers, geospatial velocity, tether tension, tether length extended, tether behavior, tether health, payload, on-board power system means, reporting means, communication means, base station mains power and auxiliary power means, mission status, appurtenant market and customer circumstances and measurable output associated with the flight mission. First values associated with at least one of these dynamic elements is measured, simulated or calculated.

The next step involves pre-determining fixed second values consistent with a selected flight mission, wherein the second values are at least one of a fixed value, a range, an array, a mathematical function that returns a fixed value, a range, array of values when employed that represent a device, system control or logical parameters, including threshold values, ranges, limits, operational goals, specification of the selected flight mission, specifications of the tethered gyrogliders and associated components, serial or registration numbers, specifications, material and weight of the components and the tether.

Every flight mission corresponds to at least one flight path associated with a set containing at least one first value and at least one second value. The control system of the present disclosure is provided with a learning and library manager comprising a repository having stored sets of first values and second values for each flight path consistent with a flight mission.

Once second values for a current flight mission are determined, at least one of iterative comparison, analysis, simulation, optimization, testing, ranking, rating and filtering of the measured, calculated or simulated current first values is performed with reference to a stored set containing stored first values, to compute corrected first values to co-operate with the second values and generate at least one corrected flight path corresponding to the desired flight mission.

Once a current set of corrected first values, associated second values and a corrected flight path at least approximately corresponding to the current flight mission is determined, the current set is appended to a repository of the learning and library manager, as a stored set, for enabling further learning by the flight control system.

The corrected first values are then allocated, segmented, translated or transposed to at least one of flight control devices, generator controller, tension management means and base station control devices to achieve and generally maintain the position and state of the tethered gyrogliders along the determined flight path. The executed corrected flight path is now the experienced flight path that is again stored in the repository of the learning and library manager.

The determination of a flight path by the flight control system of the present disclosure is explained herein below with the aid of an exemplary equation merely intended to be representative of a hypothetical flight path calculation method that includes variables representing first values and second values representing values associated with a flight path for a desired flight mission to produce a measureable output. The first values are variables for a selected mission whereas the second values are variables across missions and fixed for a selected mission.

Hypothetically, for ease of explanation, a flight path stored in the repository of the learning and library manager could be represented as:

$$Ax^m + By^n + Cz^{mno} + D\left(\frac{t}{u}\right)\tan\beta\sin\Phi\cos\delta + \ldots = \psi \quad \text{Equation 1}$$

wherein,

A, B, C, D, represent pre-determined fixed second values for a flight path ψ consistent with a selected flight mission; variables x, y, z, t, u, Φ, β, δ, . . . represent first values; m, n, o, . . . are exponents based on aerodynamic characteristics; and ψ represents a flight path and is representative of tether angle, tether angular acceleration comprising tension, rotational and positional state, vectors and the like that identifies a flight path.

As explained herein above, the flight control system of the present disclosure receives current first values $x_1$, $y_1$, $z_1$, $t_1$, $u_1$, $\Phi_1$, $\beta_1$, $\delta_1$, . . . corresponding to at least some of the dynamic elements stated herein above. Second values A, B, C, D, . . . are pre-determined for a selected flight mission. Iterative operations like comparison, analyses, optimization and the like are performed on the current first values $x_1$, $y_1$, $z_1$, $t_1$, $u_1$, $\Phi_1$, $\alpha_1$, $\delta_1$, . . . until the sets of corrected first values $x_2$, $y_2$, $z_2$, $t_2$, $u_2$, $\Phi_2$, $\beta_2$, $\delta_2$, are obtained which satisfy or tend to satisfy Equation 1 within acceptable deviations to achieve and generally maintain the flight path ψ. From the sets of corrected first values, one or more sets are selected to determine a flight path ψ which at least approximately corresponds to the desired flight mission. Once the flight path ψ is achieved, the corrected first values $x_2$, $y_2$, $z_2$, $t_2$, $u_2$, $\Phi_2$, $\beta_2$, $\delta_2$, . . . along with the second values A, B, C, D, are stored in the repository as an additional stored set corresponding to the flight path ψ. Furthermore, the corrected first values $x_2$, $y_2$, $z_2$, $t_2$, $u_2$, $\Phi_2$, $\beta_2$, $\delta_2$, . . . are then suitably allocated, segmented, translated or transposed to at least one appurtenant control system.

Decisions occurring within the triage of a typical flow diagram as illustrated in FIG. 1 are driven by considerations to generate a flight path from one or more value-functions incorporating the first values, second values, all related by way of inherent dynamic state variables associated with proximate wind vectors, the gyroglider and its flying elements, tether and appurtenant system behavior, while the first and second values may or may not adhere to constraints that may possess explicit or implicit anticipated measured values, affirmative, contrary to or without affecting the mission.

In the case of a mission goal seeking "Net Average Power" (NAP) harvested per operational power cycle. The optimization of NAP, is to be achieved with due regard for practical flight constraints, an example of which might be "to not exceed value of a specified extensive tether force". This set of conditions could be expressed analytically as the Net Energy harvested over a cycle divided by the time required to complete that same cycle, $$NAP = \left[\frac{NE}{Tend - Tstart}\right]$$

wherein,

NAP is the Net Average Power per power cycle, and is the mission value-objective for which a flight path, an optimal solution, is sought;

NE is the Net Energy Harvested per power cycle;

Tstart is the start time for a gyroglider power cycle; and

Tend is the termination time for a gyroglider power cycle.

The Net Energy (NE) harvested could then be expressed as the mathematical integral of the work done (energy experienced—generated while playing out and required while rewinding) by the base station winch power-capstan means, $$NE = \int_{Tstart}^{Tend} s * [Tw] * d\phi$$

wherein, s represents a displacement component based on at least one first value;

Tw is tether tension at the winch, a measureable value;

$d\Phi$ is a differential change in winch power capstan rotation;

Tstart is the start time for a gyroglider power cycle; and

Tend is the termination time for a gyroglider power cycle.

Note that in general, the parameters NE, NAP, Tw, and $d\phi$, are all either explicitly or implicitly functions/relations of and/or dependent upon, the first values, second values, and measured values of this disclosure, expressed analytically below as functional depictions.

wherein, $NE=fNE(x1,y1,z1 \ldots ;x2,y2,z2 \ldots ;m1,m2,m3 \ldots)$ $NAP=fNAP(x1,y1,z1 \ldots ;x2,y2,z2 \ldots ; m1,m2,m3 \ldots)$ $Tw=fTw(x1,y1,z1 \ldots ;x2,y2,z2 \ldots ;m1,m2,m3 \ldots)$ $d\phi=fd\phi(x1,y1,z1 \ldots ;x2,y2,z2 \ldots ;m1,m2,m3 \ldots)$ wherein, x1, y1, z1 . . . represents a set of first values;

x2, y2, z2 . . . represents a set of fixed second values;

m1, m2, m3 . . . represents a set of measured values;

fXXX . . . represents a functional dependence upon a set of variables

As a practical commercial consideration, maximizing NAP must adhere to mission constraints that might relate to neither breaking nor abusing the tether by over-stress among other wear and tear-causing tether behaviors. Such a desired condition might be stated as a subsidiary constraint equation, expressed as the following inequality, $Tw(x1,y1,z1 \ldots ;x2,y2,z2 \ldots ;m1,m2,m3 \ldots) < y1$ wherein, y1 is a second value, and represents a tether tension value, greater than which, the mission must not exceed.

In addition to the explicitly stated constraints above, the operation of the gyroglider could itself be conducted so as to produce the greatest lift (effective extensive thrust acting upon the tether) consistent with each point of the flight path; such a gyroglider configuration is depicted as a set of first values that is a tabulation of gyroglider rotating wing/blade settings that produces a range up to a maximum anticipated lift at each flight state. For example, for a given altitude and air density, relative wind vector magnitude, and rotor-disk angle of attack, there corresponds a value of rotor blade "collective" that produces maximum lift. Thus the Flight Control System's Learning and Library means and method would include a tabulation of first values with arguments corresponding to the aerodynamic conditions from which would be determined an optimal rotor blade collective setting as a second value. The collective setting could be expressed as, $COL=fCOL(x1,y1,z1 \ldots ;x2,y2,z2 \ldots ; m1,m2,m3 \ldots)$ This collective setting, combined with extant flight behavior produces a measured first value of "rotor rotation rate", RPM. Due to dynamic wind vectors and other flight conditions, the RPM first value may correspond to conditions deemed inadvisable and out of a range of corresponding second values. As such, an excessively high RPM that could threaten structural integrity of the rotor or other systems, or an RPM that is excessively low as to threaten continued autorotation. The conditions then become yet another set of constraints to the flight path calculation and optimization, and expressed by the two inequality equations below, $RPM(x1,y1,z1 \ldots ;x2,y2,z2 \ldots ; m1,m2,m3 \ldots) > RPMmin$ $RPM(x1,y1,z1 \ldots ;x2,y2,z2 \ldots ; m1,m2,m3 \ldots) < RPMmax$ All the above then pose a set of coupled, nonlinear, simultaneous equations that are subject to numerical solutions by means of the various techniques of modern multivariate, nonlinear control optimization theory. From this solution, a set of first values results that characterize both the gyroglider's flight path through space and primary control effectors seeking to achieve the flight path.

Note that while this is a simplistic example, in actual application of the methods of this disclosure, such as simulations, tests, and optimizations could be extensively expanded to reflect constraints in addition to simply protecting the tether, rotor hub and blade, and appurtenant systems' health.

As practical constraints and trade-offs reflect a balance between conserving reserve tether longevity in the face of low offered market purchase price for power, by limiting tether tensions to less than maximum value; alternatively, operating at or less than its maximum value could be practical with high offered market purchase price for power.

The flight control system of the present disclosure also considers secondary mission objectives on opportunistic, elective or a mandated basis. For instance a secondary mandated mission could be to maintain a minimum of time and geospatial location specific wind and weather data collection, and to discover wind vectors and to determine envelopes that may prove more productive for identified missions.

Figure 2:
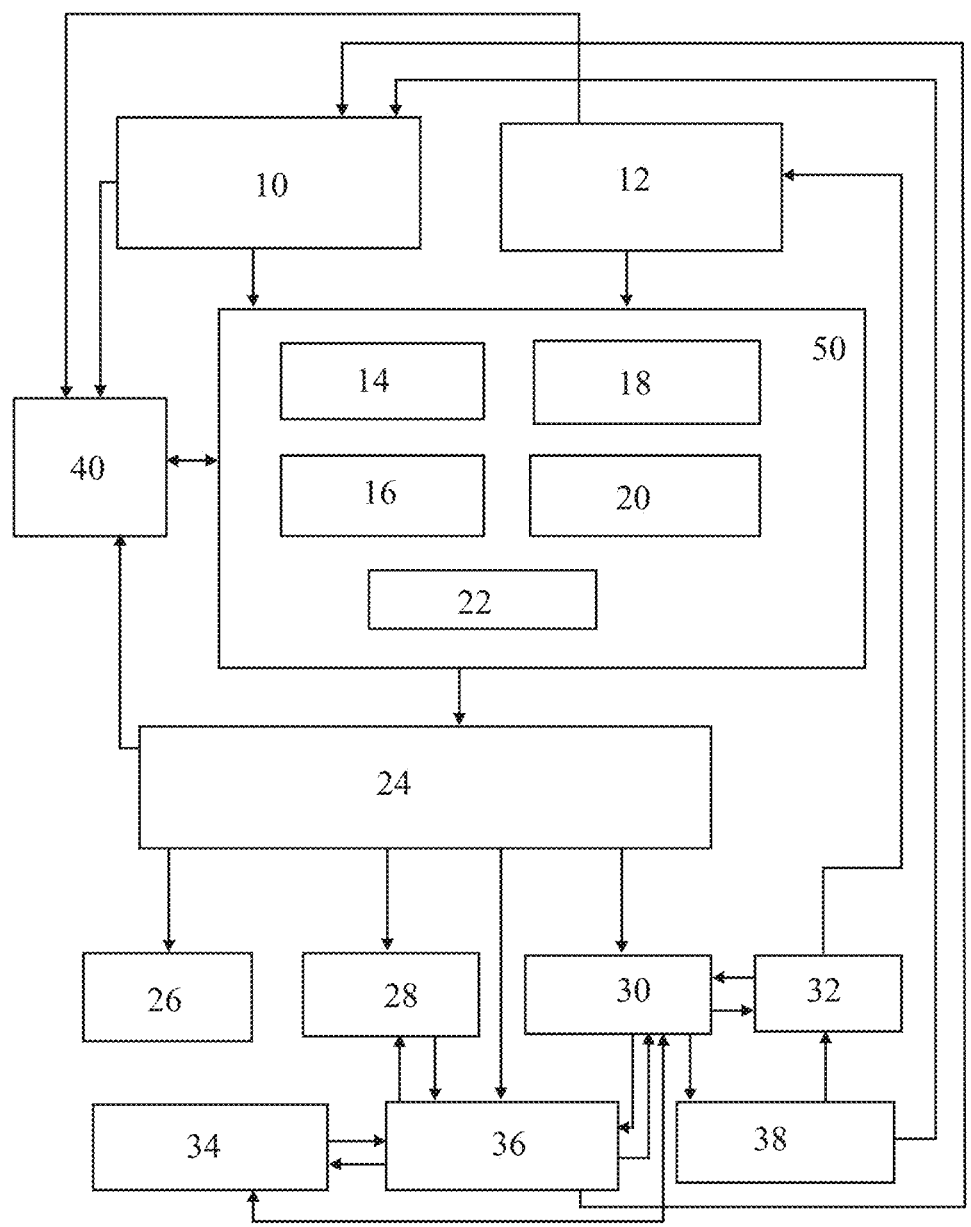
FIG. 2 illustrates a block diagram for the control system of FIG. 1.

Referring to FIG. 2, the main components of the control system for at least one tethered gyroglider as envisaged by the present disclosure along with their intended functions are listed herein below.

Input manager 10: The input manager 10 receives at least one of measured, simulated or calculated values that describe or represent the current state of a dynamic element related to the flight control system operation, including at least one of proximate wind vectors, wind forecasts, base station location, obstructions, geospatial locations of the tethered gyroglider(s) involved in the selected mission, geospatial location of proximate gyrogliders and their tethers, geospatial velocity, tether tension, tether behavior, tether health, payload, state of the tethered gyroglider, on-board power system means, communication means, base station mains power and auxiliary power means, mission status, appurtenant market and customer circumstances and measurable output associated with the flight mission that constitute first values.

Settings manager 12: The settings manager 12 receives at least of a fixed value, a range, an array, a mathematical function that returns a fixed value, a range, array of values when employed that represent a device, system control or logical parameters, including threshold values, ranges, limits, operational goals, specification of the selected flight mission, specifications of the tethered gyrogliders and associated components, serial or registration numbers, specifications, material and weight of the components and the tether that constitute relatively fixed second values. These second values may vary across missions but remain relatively fixed for a selected mission.

Learning and Library Manager 40: The learning and library manager 40 of the flight control system of the present disclosure contributes to facilitating optimal outcomes by seeding, boot-strapping or otherwise initiating value sets for required simultaneous, non-linear, multivariate, interdependent and optionality-inclusive calculations to enable, for example, mission-qualified measurable value opportunity-seeking and optimization methods among the potentials described by the interrelated cooperation of at least two of wind, flight, tethered gyroglider performance and base station envelopes, and at least one flight path that incorporates controls and settings of airborne apparatus, tether, tether tension means, power generation, base station control means and appurtenant business and mission controller means. The repository of stored sets provides a set of values that serves as a guideline for the flight control system to determine a flight path that approximates optimal values for the current flight mission.

Flight path controller 50:—The flight path controller 50 receives the first values from the input manager 10 and the second values from the settings manager 12. The flight path controller 50 further comprises a flight path generator 16 and an editor 20. The flight path generator 16 performs at least one of iterative comparison, analysis, simulation, optimization, testing, ranking, rating and filtering of the current first values, received in relation to a current mission, with reference to a stored set containing stored first values, to compute corrected current first values to co-operate with the current second values and generate at least one corrected flight path corresponding to the desired flight path. The editor 20 appends the stored sets with the current set containing the corrected current first values, associated current second values and the corrected flight paths. Furthermore, blades of the gyroglider are characterized by a plurality of elements and these elements comprise essential characteristics that contribute to the mission and control of tethered gyrogliders. A finite implementation of the blade elements is incorporated into the flight path generator 16.

The flight path controller 50 further comprises at least one of forecasting means 14, event manager 18, and reporting means 22.

Forecasting means 14: The forecasting means 14 determines a wind envelopes (characterized by a finite amount of wind energy which may or may not be precisely known or determined) of variable geospatial dimension and duration relative to a plurality of base station envelopes consistent with at least a part of a farm, and flight envelopes corresponding to all possible positions of the gyroglider, and the gyroglider performance envelope. Alternatively, current wind conditions and wind envelopes are determined and wind conditions and wind envelopes comprising variable wind energy content are forecast for a predetermined duration of a flight in a predetermined flight envelope defined by all possible positions of the tethered gyroglider. The forecasting means 14 is typically a calculating means located local or remote to the tethered gyroglider control system, and includes autonomous capabilities to provide data, calculations and messaging means so as to integrate, act independently or in harmonious cooperation and otherwise collaborate with appurtenant systems.

Event manager 18: The event manager 18 determines safety and certainty of performance of each of the tethered gyrogliders based on the selected flight mission and also prescribes either an immediate prescriptive action or another flight mission. The event manager 18, accordingly, is geared for sensing fitness for purpose/integrity/maintenance/corrective/preventive issues and generating a suitable response. The safety of the mission is characterised by at least four dimension: 1) operation, as in collisions, 2) tether breaks or other failures, 3) monitoring health of the gyroglider, tether, base station and appurtenant systems to anticipate and thereby seek to prevent failures, but to also optimize lifecycle and lifetime costs and 4) other factors that diminish capacity or certainty of or actual performance versus mission.

Reporting means 22: The reporting means 22 reports data associated with at least one of the first values including wind, atmospheric, aeronautical or mechanical engineering data.

Activity processor 24: The activity processor 24 receives and monitors the corrected current first values and performs at least one of allocating, segmenting, translating and transposing of the corrected first values to at least one of flight control devices 26, generator controller 28, tension management means 36 and base station control devices 30 to achieve and generally maintain the position of the at least one tethered gyroglider along the desired flight path. The activity processor 24 may alternatively provide guidance to at least one autopilot by providing inputs in the form of the corrected first values and associated second values for achieving the desired flight path.

Flight control devices 26—The flight control devices receive the corrected current first values from the activity processor 24 to control an array of means and methods to control the behavior of the gyroglider and appurtenant systems including:

Increase or decrease thrust—for rotor blades of the gyrogliders, an array of means and methods to change blade element orientation versus incoming wind vectors, their aerodynamic and physical characteristics, their orientation relative to the fuselage, and that otherwise change aeronautic, aero-elastic, gyroscopic, centripetal and other forces that increase or decrease thrust; that causes thrust to be either increased or decreased symmetrical or asymmetrically about one or more gyroglider's control axes, an array of means and methods principally of a propulsion system.

Pitch—array of means and methods to change the orientation of fuselage's lateral axis, for example, relative fuselage nose up or nose down.

Roll—array of means and methods to change the orientation of the fuselage's longitudinal axis.

Yaw—array of means and methods to change the orientation of the fuselage's perpendicular axis.

Increase or decrease onboard power generation—an array of means and methods that increase or decrease torque acting on the rotor, or other corresponding behavior by means that convert energy, including increased or decreased drag acting on the gyroglider or its tether.

Tether functions—array of means and methods to affix, move or manipulate attachment points and geometry relative to the gyroglider's center of thrust or lift, including those that comprise means and methods of gyroglider control, to monitor and serve to control tether tension, and safety devices that include the ability to disconnect the tether from the gyroglider.

Payload functions—array of means and methods to attach, provide power, communications, information as inputs or settings, and other services, to control and otherwise operate a payload affixed to the gyroglider or to its tether, or for the gyroglider and its appurtenant means to be guided or otherwise controlled by the payload.

Timing and synchronization functions—array of means and methods to determine, maintain and synchronize time-based parameters for a gyroglider or among a plurality of gyrogliders and appurtenant devices, sensors, smart-sensor networks, bespoke calculating machines and control systems.

Generator controller 28: The generator controller 28 receives and monitors the corrected current first values from the activity processor 24 to control a motor generator that acts as a power-generating brake during tether payout and as a winch during tether rewind cycles.

Tension management means 36: The tension management means 36 receives the corrected current first values from the activity processor 24 to maintain, increase or decrease tether tension; stop, increase or decrease payout or rewind tether speed and length of tether extended; detects and monitors tether tension and motion, and transmits resulting data to the input manager 10.

Base station control devices 30: The base station control devices 30 co-operate with a business and mission controller 32 to compare the measurable output 38 based on simulations, forecasts, expectations, market-based settings including quality, quantity, pricing, optionality, bidding and costs, in participation with the proximate facilities of associated commercial entities, appurtenant control systems and networks and to communicate the comparison to the settings manager.

Business and mission controller 32: The business and mission controller 32 compares the measurable output based on simulations, forecasts, expectations, market-based settings including quality, quantity, pricing, optionality, bidding and costs, in participation with the proximate facilities of associated commercial entities, appurtenant control systems and networks and further communicates the comparison to the settings manager 12.

Tether health monitoring means 34: The tether health and monitoring means 34 determines the tether health a) by recording tether activity including wind and rewind activity, tether lengths extended or retrieved, stresses experienced and relevant events (accidents), b) by material characterization including inspection laser, x-ray, sonic, thermal or optical method c) by determination of dimensions, surface characteristics (abrasion or other wear and tear), contamination by grit, fluids or other affixed or embedded materials, and d) by indicator such as coatings, marking dyes, embedded markers that may fade or that would otherwise indicate change in strength, elasticity, plasticity or other characteristic with experience.

Measurable output 38: The measurable output 38 includes at least one of time aloft, areas viewed, items of interest identified, monitored and subsequent actions enabled, communication enabled, geoengineering accomplished, civil engineering data gathered, climatic data gathered, power generated, timing, quantity and quality of power produced in relation to simulations, forecasts, expectations, or market demand, pricing and negotiations.

The position of the gyroglider is constrained by its tether, anchor point of the base station, base station envelope that includes all geospatial locations a tethered gyroglider could fly while attached to the base station anchor point, the position of other tethered gyrogliders and their tethers participating in the same or a different mission, the position of any other gyroglider in the vicinity, and the position of any geographical feature, structure or restricted airspace capable of impacting the flight or mission.

Figure 3:
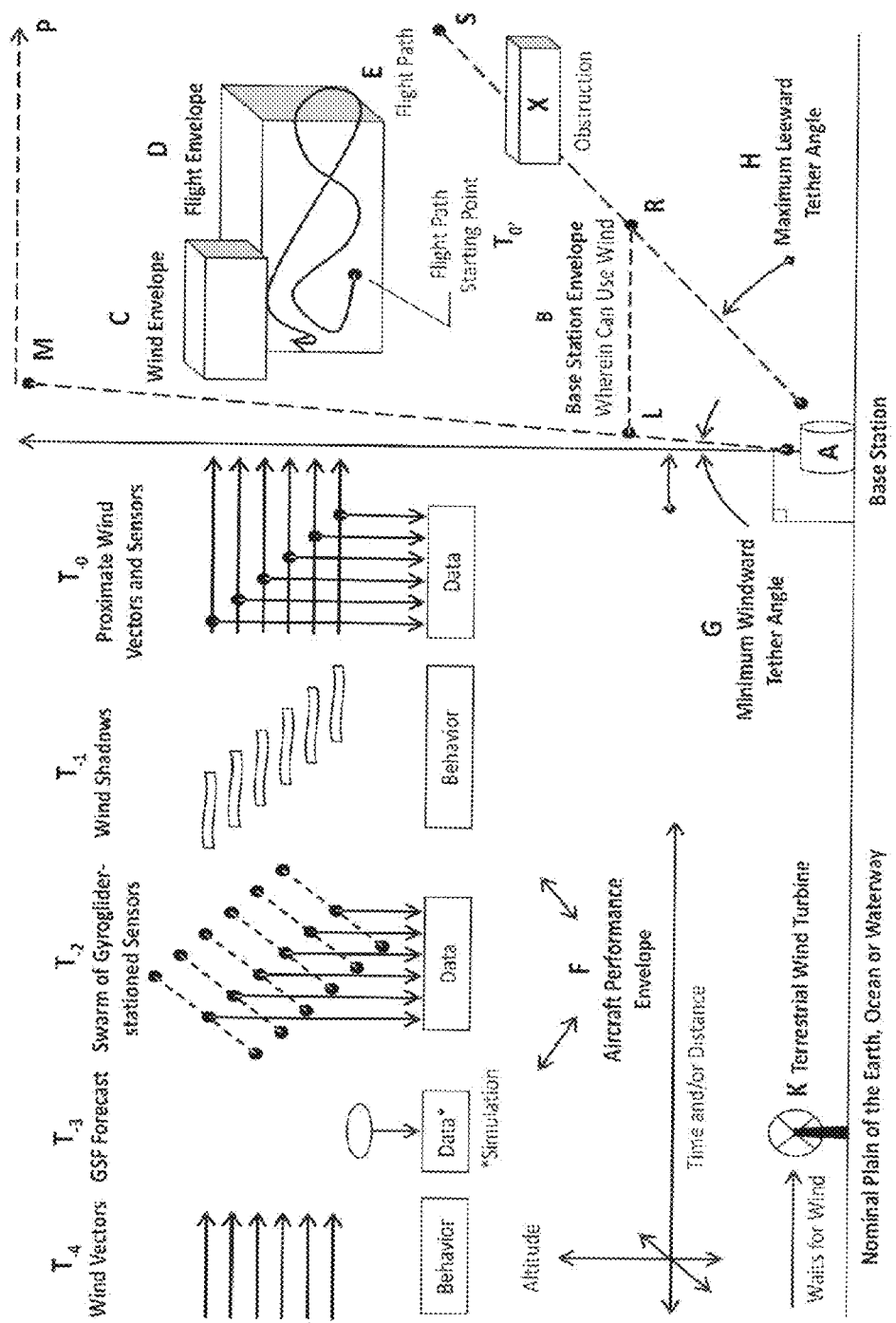
FIG. 3 illustrates a schematic representation of elements involved in wind forecasting in the control system of FIG. 1.

FIG. 3 illustrates a schematic representation of elements involved in wind forecasting in the control system of FIG. 1.

Wind Vectors $T_{-4}$ shown as right-facing arrows represent the behavior of dynamic winds present at many altitudes, including jetstream winds. Wind vectors may be actual, measured or simulated, for example, as by way of assumption that recent wind behavior, actual, measured or simulated, continues or will change.

Global Forecast System (GFS) Forecast $T_{-3}$ wind shown as an ellipse at a specific altitude, represents simulated data from any comparable source, which generally describes winds present at an altitude described in millibars (1 millibar=100 newtons per square meter of atmospheric pressure) and does not reference actual wind vectors, directly-measured wind vectors or other information present at a specific time and geospatial location. This simulated data is calculated by weather models from relatively sparse inputs from episodic observations generally by weather balloons or commercial and military aircraft (direct observations and directly-calculated methods, respectively), and ground-based or satellite systems and sensors that, for example, track water vapour, clouds or other indirect observation methods.

Swarm of Gyroglider-stationed Sensors $T_{-2}$ stationed on persistent tethered gyrogliders and their tethers, airborne at an array of altitudes and geospatial locations and times, and capable of transmitting and receiving data among one and another, and with a central facility.

Wind Shadows $T_{-1}$ indicates the behavioral change to otherwise unfettered wind vectors caused by airborne gyrogliders or otherwise that serve to block, redirect or disturb wind vectors that can be observed and described directly or indirectly by instrumentation or comparison of windward and leeward wind vectors.

Local Wind Vectors and Sensors $T_{-0}$ are wind vectors proximate the gyrogliders and sensors stationed on individual gyrogliders or along their tethers, each capable of transmitting data among the gyrogliders to the input manager 10.

Base station A is affixed to the earth at a finite location upon the nap of the earth, or affixed to a vehicle that may or may not be in a variable location. The base station A includes tension management means 36 and appurtenant apparatus necessary for system operation and capable of transmitting and receiving data among one base station and another, and with a central facility.

Base station envelope B describes the proximate geospatial region above the nap of the earth of the base station A wherein tethered gyroglider flight is determined to be practical, to seek favorable wind vectors $T_0$, wind envelopes C, flight envelopes D and flight paths E, to create a measureable output 38. This geospatial region is generally described with P-M representing the top of an inverted and inclined cone-like solid shape as an approximation of actual surfaces that comprise the shape's boundaries, with its inverted apex at the base station A and internal volume contained within the cone-like shape above the minimum service altitude L-R, and below the base of the inverted cone and maximum service altitude P-M comprises the base station envelope B, whose dimensions and inclination varies with respect to proximate wind vectors and gyroglider flight performance envelopes F, tether and mission.

Dotted line A-L-M represents the tether, anchored at one end to the base station A, and a flying gyroglider affixed proximately to the tether's other end. The tether extends upwards through dotted line segment L-R, the minimum service altitude for tethered gyroglider's safe and sufficient operation, to dotted line segment M-P, the corresponding maximum service altitude for safe and sufficient operation.

Wind Envelope C is a multidimensional geospatial volume of variable dimension and duration that describes particular wind vectors, actual, measured, simulated or forecasted therein. Wind envelopes can be of any dimension, geospatial location and in union with other wind envelopes.

Flight Envelope D is a multidimensional geospatial volume of variable dimension, geospatial location and duration used to describe and that specifically constrains, all possible geospatial locations of a gyroglider, actual, simulated or forecasted therein. Flight envelopes can be of any dimension and in union with other flight envelopes, however, as a practical matter, no two or more gyrogliders can occupy the same geospatial location, including a minimum marginal adjacent geospatial safety zone, surrounding each gyroglider and their tethers, if any, at the same moment in time.

Flight Path E is a multidimensional line of geospatial locations and states for a tethered gyroglider, actual, simulated or forecasted. Not illustrated is the corresponding flight path for all geospatial locations and states of tethered gyroglider's tether, which extends from that gyroglider aloft from its base station A below.

Gyroglider Performance Envelope F is a multidimensional geospatial space that describes all possible geospatial locations and states where flight behaviors of gyrogliders, its tethers, gyrogliders flying in proximity of other gyrogliders a) are safe, b) are controllable, or c) are unsafe; d) are uncontrollable; e) are to return to safe and controlled flight.

Flight Path Starting Point $T_0$, is a geospatial point and time that describes the current gyroglider state and location; or, that describes the first of a series of forecasted or actual geospatial points in a series of states and points.

Minimum Windward Tether Angle G between the dotted line A-M representing a gyroglider's tether and a vector perpendicular to the base station A, where tethered flight at a lesser angle would prove impractical.

Dotted line A-R-S represents the tether, anchored at one end to the base station A, and to a flying gyroglider affixed proximate to the tether's other end. The tether extends upwards through dotted line segment L-R, the minimum service altitude for tethered gyroglider's safe and sufficient operation.

Maximum Leeward Tether Angle H between the dotted line A-S representing a gyroglider's tether and a vector perpendicular to the base station A, where tethered flight at a greater angle would prove impractical.

Terrestrial Wind Turbine K is a rigid structure affixed to the nap of the earth, or at the level of the ocean or a waterway, that can only respond to proximate wind vectors, and can neither search for and locate other winds, nor reposition itself contemporaneously to a new geospatial location to employ those other wind vectors.

Obstruction X are objects that may intersect the base station envelope B, wind envelope C, flight envelope D, flight path E, that may cause or create a wind shadow $T_{-1}$, or that may endanger or interfere with the otherwise faultless operation of the base station A or any system element, control or system.

Figure 4:
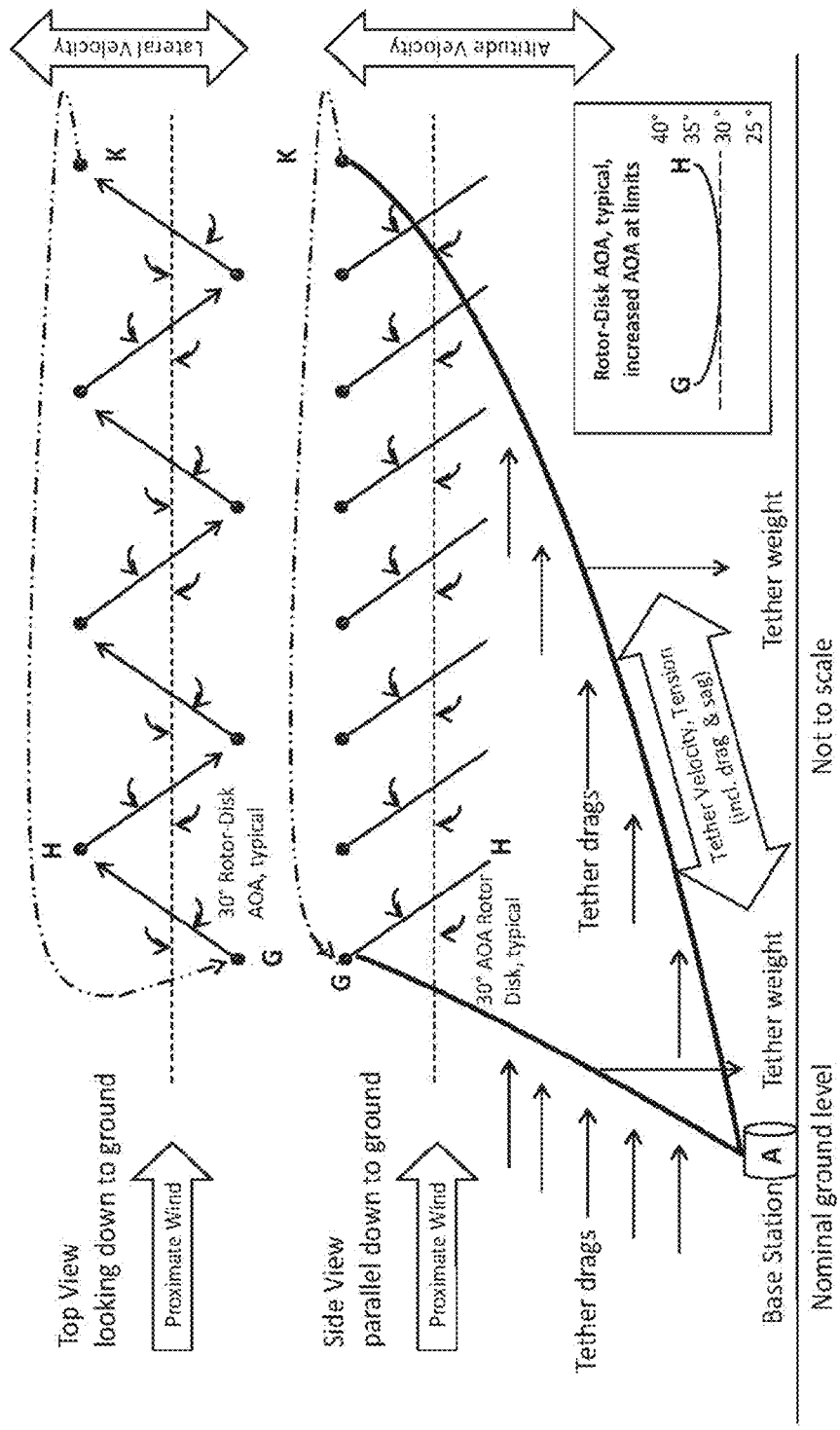
FIG. 4 illustrates repetitive shunting maneuvers by at least one tethered gyroglider.

FIG. 4 illustrates repetitive shunting maneuvers by at least one tethered gyroglider. Each gyroglider would typically have multiple flight paths, within the gyroglider's flight performance envelope, within one or more wind envelopes, increasing tether drag and weight, maintaining altitude, and without overwhelming and breaking the tether due to excessive tension.

Figure 5:
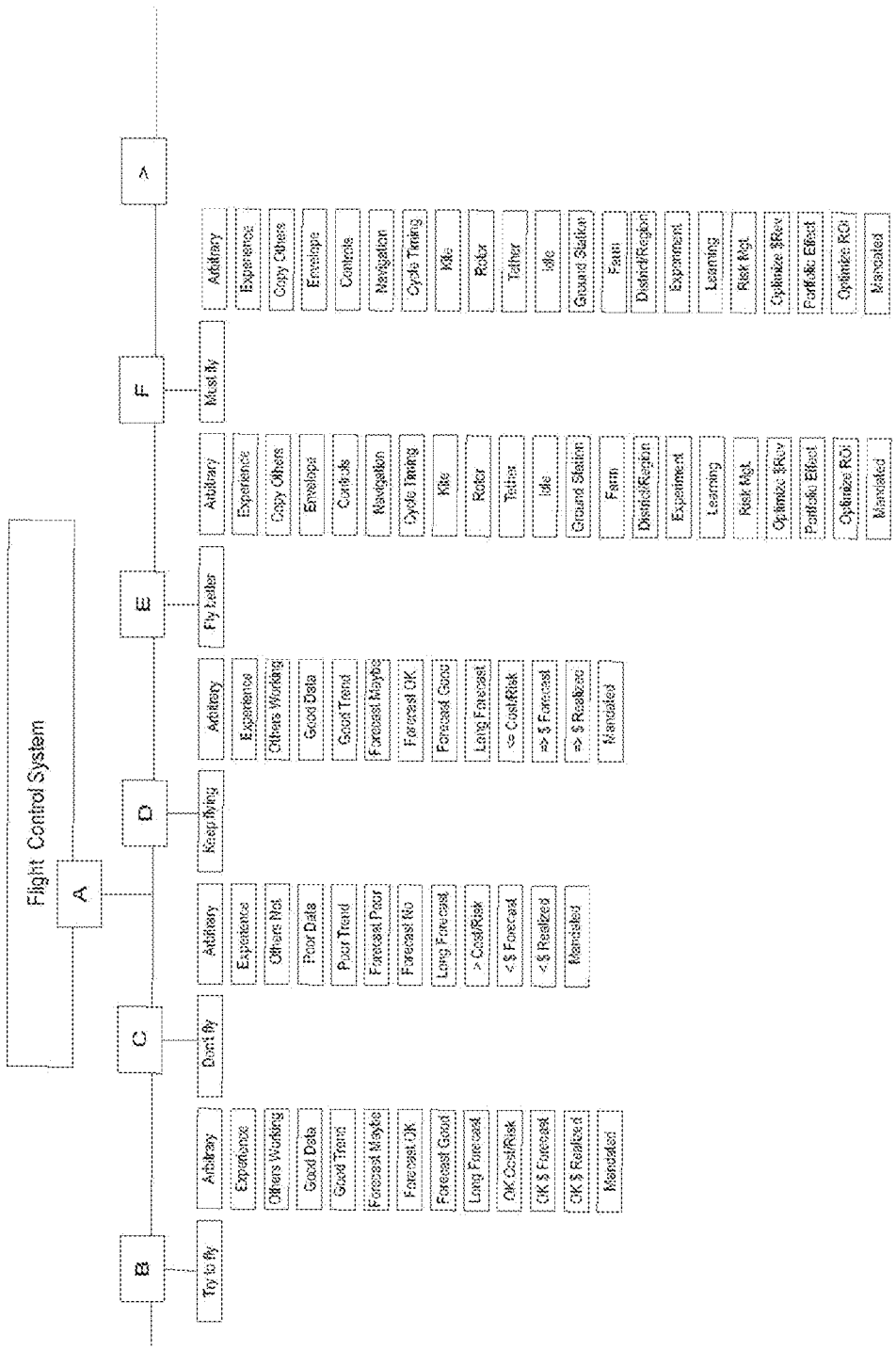
FIG. 5 illustrates a schematic representation indicating general objectives of the control system in accordance with the present disclosure and features characterizing each objective for at least one tethered gyroglider.

FIG. 5 illustrates a schematic representation indicating general objectives of the control system in accordance with the present disclosure and features characterizing each objective for at least one tethered gyroglider. The control system in accordance with the present disclosure seeks to determine optimal flight paths of at least one gyroglider pertaining to at least one of eight generalized objectives with respect to tethered gyrogliders: 1.) to attempt flight, 2.) not to fly, 3.) to keep flying, 4.) to fly better, 5.) to fly by mandate ("must fly") and not illustrated, 6.) to fly to avoid harm and 7.) to fly to return to base station and 8) to manage base station systems.

A goal to attempt to fly a tethered gyroglider may be decided arbitrarily, based upon observation that other tethered gyrogliders are flying, or operator experience may rely upon exogenous factors other than favorable present wind conditions or of those that are anticipated, market conditions and forecasts, or because of a recognition of some affirmative general trend in wind conditions and/or markets for power, or favorable for missions of similar characteristics and requirements, or because flying a mission of a tethered gyroglider is mandated or otherwise required. Such goal and decision to attempt to fly may or may not require human intervention, special staging or apparatus or facilities that themselves may be fully automated, or may become functional through human intervention.

A goal not to fly a tethered gyroglider may be decided arbitrarily based solely on unfavorable conditions and/or those that are anticipated by one or more forecasts to be unfavorable, or unfavorable for missions of similar characteristics and requirements, or because flying a mission of a tethered gyroglider is otherwise prohibited or restricted or not to fly mission is mandated. A goal not to fly may result from a decision to retrieve or otherwise land a tethered gyroglider from an altitude above the nap of the earth to the tethered gyroglider's base station. Such goal and decision not to fly may or may not require human intervention, special staging or apparatus or facilities that themselves may be fully automated, or may become functional through human intervention.

A goal not to fly a tethered gyroglider may be decided arbitrarily, based upon observation that other tethered gyrogliders are flying perhaps poorly, or operator experience may rely upon exogenous factors other than unfavorable present wind conditions or of those that are anticipated, market conditions and forecasts are unfavorable, or because of a recognition of some negative general trend in wind conditions and/or markets for power, or because flying a mission of a tethered gyroglider is otherwise prohibited or restricted, or not to fly mission is mandated or the then current flight is required to end. Such goal and decision not to fly may or may not require human intervention, special staging or apparatus or facilities that themselves may be fully automated, or may become functional through human intervention.

A goal to fly a tethered gyroglider with a goal of improved measurable value or mission results may be decided arbitrarily, based upon observation that other tethered gyrogliders are flying perhaps poorly, or operator experience may rely upon exogenous factors other than favorable or unfavorable present wind conditions or of those that are anticipated, market conditions and forecasts are favorable or unfavorable, or favorable or unfavorable for missions of similar characteristics and requirement, or because of a recognition of some positive or negative general trend in wind conditions and/or markets for power, or because flying a mission of a tethered gyroglider is mandated or otherwise required, or alternatively prohibited or restricted, and consistent with each of the above the control system seeks to optimize the production of a measurable quantity while simultaneously minimizing cost and risk that may diminish that measurable quantity. Such goal and decision to fly with improved results may or may not require human intervention, special staging or apparatus or facilities that themselves may be fully automated, or may become functional through human intervention.

A goal to fly a tethered gyroglider seeking improved results may also be decided arbitrarily, based solely on favorable or unfavorable conditions and/or those that are anticipated by one or more forecasts to be favorable or unfavorable, or because flying a mission of a tethered gyroglider is mandated or otherwise required, or alternatively prohibited or restricted, and consistent with each of the above requirements, the control system seeks to optimize the production of a measurable quantity while simultaneously minimizing cost and risk that may diminish that measurable quantity. Such goal and decision to fly with improved results may or may not require human intervention, special staging or apparatus or facilities that themselves may be fully automated, or may become functional through human intervention.

A goal to fly because it is mandated or otherwise required may be decided arbitrarily, by terms of a business contract, or by an authority empowered to establish such a requirement, and such goal to fly may or may not be influenced by conditions present, or those that are anticipated. Such goal can be to initiate a flight of a tethered gyroglider, or to maintain an already flying tethered gyroglider's current flight. Such goal to fly may or may not require human intervention, special staging or apparatus or facilities that themselves may be fully automated, or may become functional through human intervention.

A goal to fly to avoid harm may be decided arbitrarily, based upon simple observation of conditions present or those anticipated, or as a result of receiving some form of alert or signal describing an event that either may, is causing, or has caused harm to the tethered gyroglider or those in proximity together with their tethers.

A goal to fly to avoid harm may be an overriding and automatic function to help assure the safety of a tethered gyroglider and/or of others flying in proximity together with their tethers, or to avoid cost and risk that may diminish the measurable value produced. Such goal to fly to avoid harm may or may not require human intervention, special staging or apparatus or facilities that themselves may be fully automated, or may become functional through human intervention.

Figure 6:
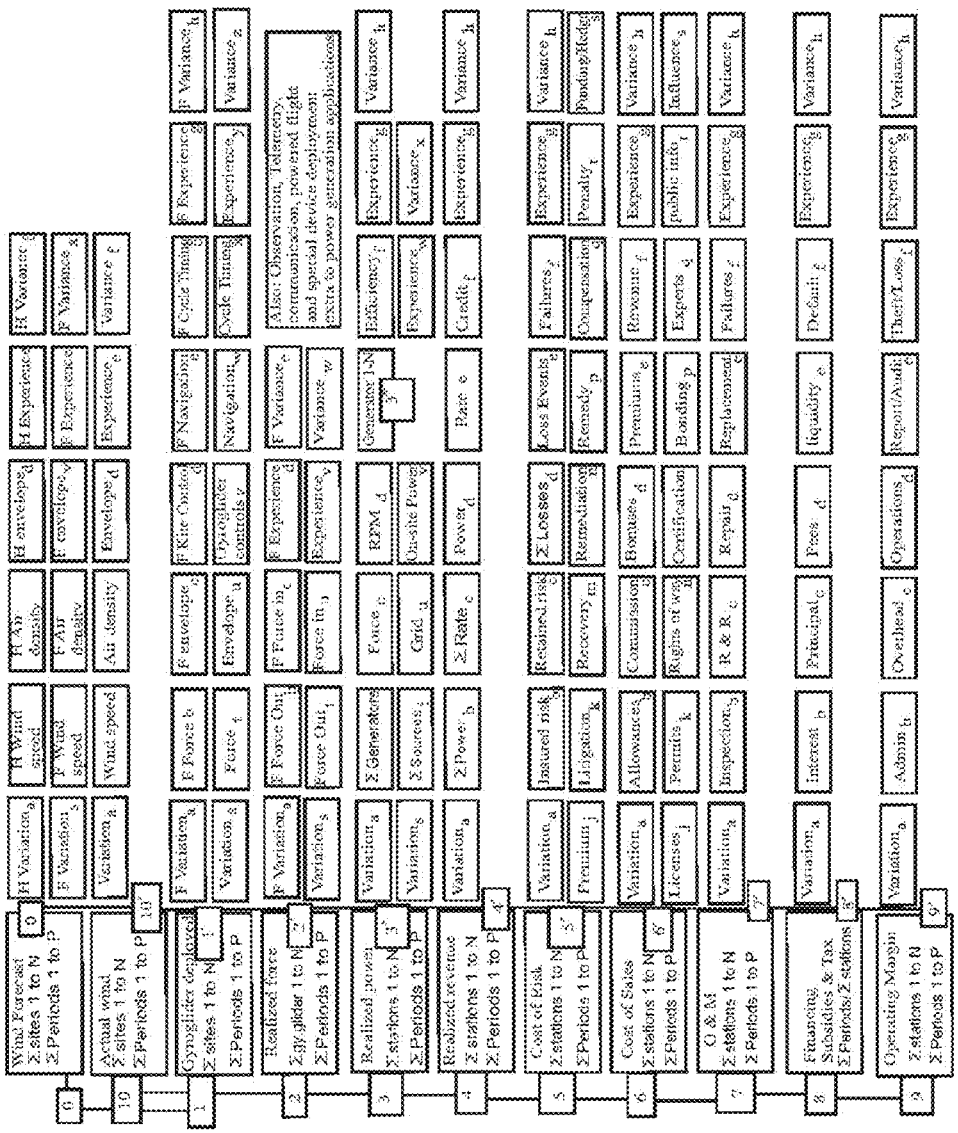
FIG. 6 illustrates a schematic representation of a union of business goals with the general objectives of FIG. 5.

FIG. 6 illustrates a schematic representation of a union of business goals with the general objectives of FIG. 5 wherein the processes across the rows are represented by H and F wherein H corresponds to historical values and F corresponds to forecasted values. 0 represents time zero, 1 and 1' represent the process for deploying the gyroglider, 10 represents the process to determine wind and 10' represents the completion of that process with those determinations as row three.

In accordance with an aspect of the present disclosure, the flight path controller of the tethered gyroglider control system as explained herein above is configured to determine, recognize and authenticate unique serial numbers and identifying codes, including unique identities and abstracted or synthesized characteristics or "DNA" of provenance, title, perfected interest, structural, functional or operating components, of the plurality of gyrogliders, their payloads, if any, and their fixtures, functional and structural components, tethers, base stations, farms and other appurtenant systems, and includes such unique serial numbers and codes, or their non-repudiable and non-refutable validity, falsification, adulteration, fitness for purpose, defective condition or their absence in its computation.

The technical advancements offered by the present disclosure which add to the economic significance of the disclosure include the realization of tethered gyroglider control systems as given herein below.

A control system for at least one tethered gyroglider that generates a predetermined measurable parameter.

A control system for at least one tethered gyroglider that generates power.

A control system for at least one tethered gyroglider that ensures reliability of performance and minimizes factors that may diminish values of desired measurable parameters.

A control system for at least one tethered gyroglider wherein a relationship between measurable values generated by the operating tethered gyrogliders and investment of a similarly measurable amount of value, effort and expense to permit their existence and operation, their payloads, if any, associated tethers, base stations, farms and related systems, or a portfolio thereof, can be determined and calculated in all instances by the control system and appurtenant business and mission control systems.

A control system for at least one tethered gyroglider wherein the measurable parameter generated by the operating tethered gyrogliders is enabled by the portfolio of winds and wind envelopes present or that may be anticipated. Such wind within a geospatial wind envelope is determined, directly or indirectly, together with subcomponents representing wind of varying velocity, direction and other characteristics. The characteristics of wind within the proximity of a tethered gyroglider's base station, such proximity may be local or anywhere within thousands of miles away, and at any altitude, moving in any direction, contribute to the determination of a geospatial wind envelope. In accordance with another aspect, the geospatial wind envelope is segmented into many geospatial wind envelopes of equal or different geospatial description, that might prove useful for the purpose of considering such wind for the purpose of a specific mission, including the calculation of flight paths of tethered gyrogliders, attempting to satisfy that mission, managing a portfolio of missions, and thereby generating the measurable value. By calculation, differentiating between wind envelopes, and the wind contained therein, some wind may have the potential to create more value than other wind, and consistent with the performance characteristics of the tethered gyroglider, its payload, if any, and the geospatial location of its base station.

A control system for at least one tethered gyroglider that attempts to optimize both the performance and the certainty of performance, and to minimize factors that diminish generation of predetermined measurable parameter, the difference between a portfolio of wind envelopes that are more likely to create value, from those less likely to create value, and wherein, navigating the gyroglider in the proximity of those wind envelopes, and consistent with constraints on such flying, including flying in proximity with other gyrogliders of like or dissimilar kind, and the geospatial position and navigation of the gyrogliders so as to avoid restricted or prohibited geospatial locations, or those that may represent hazards or increased risk to any gyroglider and its tether, base station and its operating components, farm, control systems or appurtenant systems.

A control system for at least one tethered gyroglider wherein the calculation of navigation of a tethered gyroglider is contained within one or more wind envelopes of any geospatial definition and time period, by flight envelopes that describe the tethered gyroglider's concurrent geospatial and navigational positions within the wind envelopes, constrained by the performance characteristics and flight controls of such gyroglider and its associated payload, if any, and of its tether, base station and the performance characteristics of its operating components, farm, control systems and related or appurtenant systems, and by the base station's geospatial position and appurtenant characteristics.

A control system for at least one tethered gyroglider wherein by a process of simulation, analysis, continuous calculation, optimization, and learning among other techniques, the control system becomes better able to resolve the multiple simultaneous linear and non-linear phenomena and the linear and non-linear dynamics at issue so as to improve performance, assure the certainty of performance and minimize cost and risk that may diminish value.

A control system for at least one tethered gyroglider that incorporates all means available and necessary to control the operation and navigation of tethered gyroglider, and its payload, if any, whether stationary and inoperable on the ground, and at all times it is otherwise operating.

A control system for at least one tethered gyroglider that incorporates all means available and necessary for its payload, if any, to control the operation and navigation of tethered gyroglider, whether stationary and inoperable on the ground, and at all times it is otherwise operating.

A control system for at least one tethered gyroglider that incorporates all means available and necessary to control the operation of all systems reasonably necessary to optimize performance, assure the certainty of performance and minimize cost and risk that may diminish value creation.

In the absence of a primary measurable value (economic gain or other particular benefit) enabled by the Flight Control System from tethered gyroglider operation as described herein above, it would be difficult for governments to allocate persistent airspace access for their operation to the exclusion of otherwise unfettered access for commercial and military aviation. On the other hand, without the resulting wind and atmospheric information so enabled by and employed by this Flight Control System, the secondary value, the primary measurable value gained from tethered gyroglider operation would likely be diminished or perhaps rendered impractical.

These and other advancements offered by the present disclosure are dealt with to a large extent by the descriptive matter and the accompanying drawing(s) in which exemplary embodiments of the disclosure are illustrated.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The invention claimed is:

1. A control system for at least one tethered gyroglider along a flight path consistent with at least one flight mission, said control system comprising:
   a learning and library manager having a repository, said library manager adapted to receive and store in said repository,
      at least one of measured, simulated and calculated first values corresponding to at least one dynamic element associated with the at least one flight mission;
      at least one second value corresponding to pre-determined settings associated with the at least one flight mission; and
      stored flight paths associated with stored sets containing at least one of the stored first values and at least one of the stored second values, said stored flight paths corresponding to the at least one flight mission;
   an input manager adapted to receive current first values corresponding to the current state of said at least one dynamic element;
   a settings manager adapted to receive second values associated with at least one current flight mission of the at least one tethered gyroglider;
   a flight path controller comprising:
      a flight path generator adapted to receive a current set containing at least one of said current first values and at least one of said second values and the stored flight path along with the associated at least one stored set for said at least one current flight mission; said flight path generator further adapted to perform at least one of an iterative comparison, analysis, simulation, optimization, testing, ranking, rating and filtering of the received at least one current first value, with reference to the received at least one stored first value, to compute at least one corrected first value to co-operate with the received at least one second value and generate at least one determined flight path that substantially associates with said at least one current flight mission; and
      an editor adapted to append said stored sets with said current set containing said corrected first values, said second values and said determined flight path for said at least one current flight mission; and
   an activity processor adapted to receive and monitor said corrected first values and further adapted to perform at least one of allocating, segmenting, translating and transposing said corrected first values to at least one of flight control devices, generator controller, tension management means and base station control devices to achieve and generally maintain the position of the at least one tethered gyroglider along the determined flight path.

2. The control system as claimed in claim 1, wherein said at least one current flight mission is associated with a measurable output including at least one of time aloft, areas viewed, items of interest identified, monitored and subsequent actions enabled, communication enabled, geoengineering accomplished, civil engineering data gathered, mechanical engineering data gathered, aeronautical data gathered, climatic data gathered, power generated, timing, quantity and quality of power produced in relation to market demand, pricing and negotiations.

3. The control system as claimed in claim 1, wherein said at least one current flight mission is selected from the group consisting of surveillance, communication, geoengineering, positioning of airborne assets, power generation and propulsion.

4. The control system as claimed in claim 1, wherein said flight control devices are adapted to receive said corrected first values and further adapted to control an array of means and methods to control the behavior of the at least one tethered gyroglider including controlling thrust, pitch, roll, yaw, power generation, tether functions, payload functions, reporting functions and timing and synchronization functions.

5. The control system as claimed in claim 1, wherein said tension management means is adapted to receive said corrected first values and further adapted to monitor and control tether tension, tether payout, rewind speed and tether length extended and transmit associated data to said input manager.

6. The control system as claimed in claim 1, wherein said generator controller is adapted to receive and monitor said corrected first values and further adapted to control a motor generator that acts as a power-generating brake during tether payout and as a winch during tether rewind cycles.

7. The control system as claimed in claim 1, wherein said base station control devices are adapted to co-operate with a business and mission controller to compare measurable output associated with said at least one current flight mission, based on at least one of simulations, forecasts, expectations, market-based settings including quality, quantity, pricing, optionality, bidding and costs in participation with proximate facilities of associated commercial entities, control systems and networks and further adapted to communicate the comparison to said settings manager.

8. A controller for at least one tethered gyroglider, said controller comprising:
   a repository adapted to store values for dynamic elements, settings, and flight paths;
   an input device adapted to receive the values for said dynamic elements;
   a setting device adapted to receive the values for said settings;
   a flight path controlling device comprising:
      a flight path generator adapted to generate at least one flight path for a current flight mission; and
      an editor adapted to update said repository; and
   an activity processing device adapted to achieve and maintain the position of the at least one tethered gyroglider along the flight path.

9. The controller as claimed in claim 8, wherein said flight path controlling device further comprises at least one of:
   a forecasting device adapted to either forecast or determine wind envelopes, flight envelopes and performance envelopes of each of the at least one tethered gyroglider;
   an event managing device adapted to determine safety and certainty of performance of each of the at least one tethered gyroglider; and
   a reporting device.

10. The controller as claimed in claim 8, wherein said dynamic elements include at least one of proximate wind vectors, wind forecasts, base station location, obstructions, geospatial locations of the at least one tethered gyroglider, geospatial location of proximate gyrogliders and their tethers, geospatial velocity, tether tension, tether length extended, tether behavior, tether health, payload, state of the at least one tethered gyroglider, onboard power system means, communication means, base station mains power and auxiliary power means, mission status, appurtenant market and customer circumstances, measurable output associated with the at least one flight mission.

11. The controller as claimed in claim 8, wherein said values for settings are at least one of a fixed value, a range, an array, a mathematical function that returns a fixed value, a range, array of values when employed that represent a device, system control or logical parameters, including threshold values, ranges, limits, operational goals, specification of the at least one flight mission, specifications of the at least one tethered gyroglider and associated components, serial or registration numbers, specifications, material and weight of said components and said tether.

12. The controller as claimed in claim 8, wherein said base station control devices are connected to a business and mission controller.

13. A method for controlling a tethered gyroglider along a flight path consistent with at least one flight mission, said method comprising the steps of:
   receiving and storing in a repository, at least one of measured, simulated and calculated first values corresponding to at least one dynamic element associated with at least one flight mission;
   receiving and storing in said repository, at least one second value corresponding to pre-determined settings associated with said at least one flight mission;
   receiving and storing flight paths corresponding to the at least one flight mission in said repository, the stored flight paths being associated with stored sets containing at least one of the stored first values and at least one of the stored second values;
   receiving current first values corresponding to the current state of said at least one dynamic element;
   receiving second values associated with at least one current flight mission;
   receiving at least one stored flight path along with the associated at least one stored set corresponding to said at least one current flight mission;
   performing at least one of iteratively comparing, analyzing, simulating, optimizing, testing, ranking, rating and filtering of the received at least one current first value with reference to the received at least one stored first value;
   computing at least one corrected first value to co-operate with the received at least one second value;
   generating at least one determined flight path that substantially associates with said at least one current flight mission;
   appending said stored sets with said current set containing said corrected first values, associated second values and said determined flight path for said at least one current flight mission;
   receiving and monitoring said corrected first values; and
   performing at least one of allocating, segmenting, translating and transposing said corrected first values to achieve and generally maintain the position of the at least one tethered gyroglider along the determined flight path.

14. The method as claimed in claim 13, wherein the step of receiving current first values includes the steps of determining at least one of proximate wind vectors, wind forecasts, base station location, obstructions, geospatial locations of the at least one tethered gyroglider, geospatial location of proximate gygrogliders and their tethers, geospatial velocity, tether tension, tether length extended, tether behavior, tether health, payload, onboard power system means, communication means, base station mains power and auxiliary power means, mission status, appurtenant market and customer circumstances, measurable output associated with the at least one flight mission.

15. The method as claimed in claim 13, wherein the step of generating at least one determined flight path further includes at least one of the steps of:
- forecasting or determining wind envelopes of variable geospatial dimension and duration relative to a plurality of base station envelopes consistent with at least a part of a farm, and flight envelopes corresponding to positions, states and performance envelopes of each of said gyrogliders;
- determining safety and certainty of performance of each of said gyrogliders based on said at least one current flight mission and prescribing either an immediate prescriptive action or another flight mission; and
- reporting data associated with at least one of said first values.

16. The method as claimed in claim 13, wherein the step of performing at least one of allocating, segmenting, translating and transposing said corrected first values further includes at least one of the steps of:
- receiving said corrected first values and controlling an array of means and methods to control the behavior of the at least one tethered gyroglider including controlling thrust, pitch, roll, yaw, power generation, tether functions, payload functions, reporting functions and timing and synchronization functions;
- receiving said corrected first values; monitoring and controlling tether tension, tether payout and rewind speed and tether length extended; and transmitting associated data to an input manager;
- receiving and monitoring said corrected first values; and controlling a motor generator that acts as a power-generating brake during tether payout and as a winch during tether rewind cycles; and
- comparing a measurable output associated with said at least one current flight mission, based on at least one of simulations, forecasts, expectations, market-based settings including quality, quantity, pricing, optionality, bidding and costs in participation with proximate facilities of associated commercial entities, control systems and networks and further communicating the comparison to a settings manager.

* * * * *